(12) United States Patent
Jensen et al.

(10) Patent No.: US 10,106,272 B2
(45) Date of Patent: Oct. 23, 2018

(54) REGENERATIVE ACTIVATED CARBON FILTRATION FOR AIRCRAFT OBIGGS

(71) Applicant: Parker-Hannifin Corporation, Cleveland, OH (US)

(72) Inventors: Bryan D. Jensen, Mission Viejo, CA (US); Brian A. Ault, Irvine, CA (US)

(73) Assignee: Parker-Hannifin Corporation, Cleveland, OH (US)

( * ) Notice: Subject to any disclaimer, the term of this patent is extended or adjusted under 35 U.S.C. 154(b) by 135 days.

(21) Appl. No.: 15/195,034

(22) Filed: Jun. 28, 2016

(65) Prior Publication Data

US 2016/0376019 A1  Dec. 29, 2016

Related U.S. Application Data

(60) Provisional application No. 62/185,746, filed on Jun. 29, 2015.

(51) Int. Cl.
*B01D 53/02* (2006.01)
*B64D 37/32* (2006.01)
*B01D 53/04* (2006.01)

(52) U.S. Cl.
CPC ............. *B64D 37/32* (2013.01); *B01D 53/04* (2013.01); *B01D 2253/102* (2013.01); *B01D 2257/106* (2013.01); *B01D 2257/708* (2013.01); *B01D 2258/06* (2013.01); *B01D 2259/40086* (2013.01); *B01D 2259/40096* (2013.01); *B01D 2259/4575* (2013.01)

(58) Field of Classification Search
CPC ........ B01D 2253/102; B01D 2257/106; B01D 2257/708; B01D 2258/06; B01D 2259/40086; B01D 2259/40096; B01D 2259/4575; B01D 53/04; B64D 37/32
See application file for complete search history.

(56) References Cited

U.S. PATENT DOCUMENTS

| | | | |
|---|---|---|---|
| 4,786,294 A | 11/1988 | Jonqueres et al. | |
| 6,746,513 B2 | 6/2004 | Anderson | |
| 8,808,428 B2 | 8/2014 | Gupta | |
| 8,882,886 B2 | 11/2014 | Evosevich et al. | |
| 9,205,402 B1 * | 12/2015 | Fernandes | B64D 13/06 |
| 2005/0115404 A1 * | 6/2005 | Leigh | B01D 53/0454 95/11 |
| 2005/0173017 A1 * | 8/2005 | Moravec | B64D 37/32 141/66 |
| 2007/0000380 A1 | 1/2007 | Leigh et al. | |
| 2011/0085933 A1 * | 4/2011 | Mazyck | A61L 9/205 422/4 |
| 2013/0230436 A1 | 9/2013 | Vestal et al. | |
| 2013/0255493 A1 * | 10/2013 | Gupta | B64D 37/32 95/143 |

(Continued)

*Primary Examiner* — Christopher P Jones
(74) *Attorney, Agent, or Firm* — Renner, Otto, Boisselle & Sklar, LLP

(57) ABSTRACT

An onboard aircraft inerting system includes an apparatus and method for regenerating an activated carbon media of a filter module while the aircraft is in flight. In regeneration mode, the activated carbon media is heated to a temperature sufficient to desorb the VOC contaminants adsorbed thereon and the air stream passing through the filter module is at a pressure lower than the air pressure of the air stream passing through the filter in normal inerting mode.

8 Claims, 4 Drawing Sheets

(56) References Cited

U.S. PATENT DOCUMENTS

2014/0208943 A1\* 7/2014 Gupta .................... B64D 37/32
                                                              95/14
2015/0151846 A1   6/2015 Haskins et al.
2015/0258488 A1\* 9/2015 Meirav ................ F24F 3/0442
                                                             95/115

\* cited by examiner

REGENERATIVE ACTIVATED CARBON FILTRATION FOR AIRCRAFT OBIGGS

RELATED APPLICATION

This application claims the benefit of U.S. Provisional Application No. 62/185,746 filed Jun. 29, 2015, which is hereby incorporated herein by reference in its entirety.

TECHNICAL FIELD

The present invention relates generally to air separation systems and methods, and particularly to a filtration system for air separation systems that supplies nitrogen enriched air to spaces to be inerted, such as the ullage space in an aircraft fuel tank.

BACKGROUND

Aircraft have used on-board inert gas generating systems (OBIGGS) to protect against fuel tank explosions by replacing the potentially explosive fuel vapor/air mixture above the fuel in the ullage space of the tanks with nitrogen-enriched air (NEA). The NEA is generated by separating oxygen from local, ambient air and pumping the inert, oxygen depleted NEA into the tanks.

Production of NEA typically is carried out by means of an apparatus relying on permeable membranes, or on molecular sieves. The air separation apparatus is generally referred to as an air separation module (ASM). In systems utilizing permeable membranes, the ASM typically comprises a bundle of hollow fiber membranes packaged in a cylindrical shell with an inlet and outlet at the ends of the shell, and a shell side vent port. When pressurized air enters the ASM inlet port and passes through the hollow fibers, oxygen is separated from the air stream due to diffusion through the fiber walls. That is, the fiber walls are more permeable to oxygen than nitrogen. Oxygen enriched air (OEA) exits through the side vent port and can be recaptured, but often the OEA is considered a waste gas that is exhausted overboard. The remaining NEA flows out of the ASM via the outlet port and is distributed to the ullage space of the fuel tank or tanks for the purpose of inerting the fuel tanks and thereby their reducing flammability. The ASM operates most efficiently, in terms of permeability of oxygen over nitrogen, at an elevated temperature higher than ambient temperature. The selective permeability has a direct relationship to the purity of the NEA (the more nitrogen and less oxygen, the higher the purity).

In many if not most commercial airplane applications, pressurized air used for NEA generation will originate from either an engine bleed or from a cabin air pressure source. With an engine bleed pressure supply, compressed hot air is ducted from an engine bleed air supply line and then cooled by a heat exchanger to an optimal temperature for maximum ASM performance and life.

The flow rate of NEA to a fuel tank generally depends on the stage of the aircraft's flight. On ascent, a low flow of NEA may typically be used because the fuel tank is full and the fuel tank is being depressurized. On descent, the flow rate of NEA to a fuel tank is typically higher, as there is less fuel in the fuel tank and the fuel tank is being re-pressurized.

It is conventional practice to include filtration upstream of the ASM to remove particulate and aerosols that may exist in the bleed air, since they can potentially foul, plug, or otherwise degrade the ASM if ingested.

In addition, bleed air can contain gaseous vapors originating from various organic-based fluids that are used in and around the aircraft, e.g., jet fuel, hydraulic fluid, engine turbine oil, de-icing fluid, cleaning agents, etc., collectively known as VOCs (Volatile Organic Compounds). It is known that VOC exposure is detrimental to ASMs, as the VOCs will foul ASM fibers and reduce their performance, and may even significantly impact ASM durability. For these reasons, industrial, ground-based air separation systems utilizing ASM technology commonly employ filtration to remove VOCs upstream of the ASM inlet. Typically, one or more active carbon towers are used for this purpose, the size of which can be substantial in comparison to the ASMs which the active carbon towers are protecting.

In contrast, current aircraft inerting systems make no attempt to filter or remove vapor species from the airstream, despite the knowledge that VOC exposure can be very detrimental to ASM performance and life. The lack of a vapor contaminant removal system is primarily due to the significant size and weight penalties that are believed to be inherent to this system, which would be intolerable in the highly weight-sensitive aircraft industry.

SUMMARY

In a first aspect of the invention there is provided an onboard aircraft inerting system that includes: a main inlet for connection to an upstream source of pressurized air at elevated temperature, the pressurized air containing VOC contaminants; a filter module comprising an activated carbon media for adsorbing VOC contaminants from the air stream supplied thereto by the main inlet; a thermal control system upstream of the filter module for controlling the temperature of the air stream transported to the filter module; and flow control components for directing air flow exiting the filter module; wherein in a normal mode, the flow control components direct filtered air exiting the filter module to a first passage connected to one or more air separation modules, and in a regeneration mode, the flow control components direct air exiting the filter module to a second passage connected to an overboard outlet for release to a low pressure ambient environment; and wherein in regeneration mode the activated carbon media is heated to a temperature sufficient to desorb the VOC contaminants adsorbed thereon and the air stream passing through the filter module is at a pressure lower than the air pressure of the air stream passing through the filter in normal mode.

The aircraft inerting system may further include an ozone converter upstream of the thermal control system.

In one embodiment, the filter module of the inerting system may further include a heating device for heating the activated carbon media. The filter module may also include a particulate and aerosol filter.

The flow control components may include a flow control valve and a system controller arranged to control operation of the flow control valve.

In an embodiment of the aircraft inerting system, there is a bypass line for diverting the air stream from the main inlet to the filter module so that the air stream bypasses the thermal control system upstream of the filter module. The bypass line may include a flow control valve for controlling flow through the bypass line and an orifice for reducing the pressure of the flow to the filter module. The bypass line may divert the air stream from the main inlet to the filter module so that the air stream bypasses both the thermal control system and the ozone converter upstream of the filter module.

In another aspect of the invention there is provided a method of regenerating an onboard aircraft inerting system, the method including the steps of providing a stream of pressurized air at elevated temperature, the pressurized air containing VOC contaminants; passing the stream of air through a filter module containing activated carbon media to adsorb the VOC contaminants; directing the flow of air exiting the filter module in a regeneration mode of operation to a passage connected to an overboard outlet for release to a low pressure ambient environment; and regenerating the activated carbon media by desorbing the VOC contaminants adsorbed on the carbon media while the aircraft is in flight. Desorbing the VOC contaminants includes heating the carbon media to a temperature sufficient to release the VOC contaminants adsorbed thereon.

BRIEF DESCRIPTION OF THE DRAWINGS

Embodiments of the present invention will now be described in further detail with reference to the accompanying drawings.

DETAILED DESCRIPTION

Figure 1:
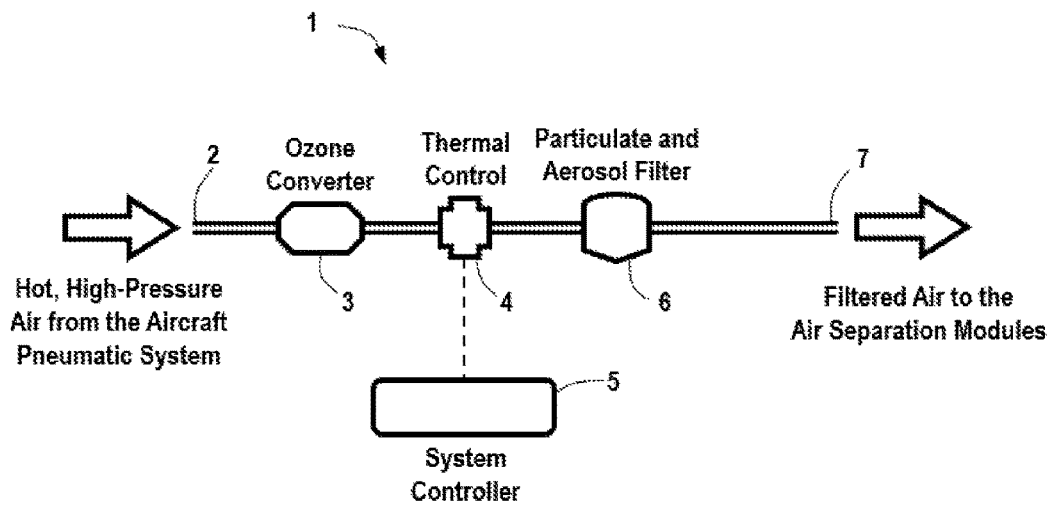
FIG. 1 is a schematic view of a conventional aircraft inerting system with standard filtration unit.

Referring now in detail to the drawings, FIG. 1 shows a simplified representation of the relevant portion of a conventional aircraft inerting system 1 upstream of the Air Separation Modules (ASMs). The inerting system 1 includes an inlet 2 arranged to receive hot, high-pressure air extracted from the aircraft bleed air system (not shown). The air received from the aircraft bleed system is typically at an elevated temperature, for example, at a temperature of at least 50° C. In some embodiments, the temperature of the air from the aircraft bleed air system is at a temperature of about 200° C. or higher. The air passes downstream through an ozone converter 3, where the high temperature air is conditioned by removing or reducing its ozone content. Ozone can cause damage to other components of the aircraft inerting system, in particular to the polymer membranes of the air separation system. Downstream of the ozone converter 3 is a thermal control unit 4, which cools the air passing through it, typically from about 200° C. to between about 50° C. and 100° C. Regulation of the air temperature entering the ASMs is accomplished by means of the system controller 5, as well as sensors and a source of cooling air (not shown). The cooled air is filtered by a particulate and aerosol filter 6 to remove particulates and aerosols from the air stream. The air is then passed through transport line 7 to the ASMs (not shown). Conditioning of the air stream is necessary to achieve acceptable ASM performance and life span.

However, the filter 6 of FIG. 1 does not contain vapor removal capability, so any VOCs present in the bleed air stream pass directly through and are ingested by the ASMs. This can be detrimental to ASM performance and durability, particularly over long-term operation.

Figure 2:
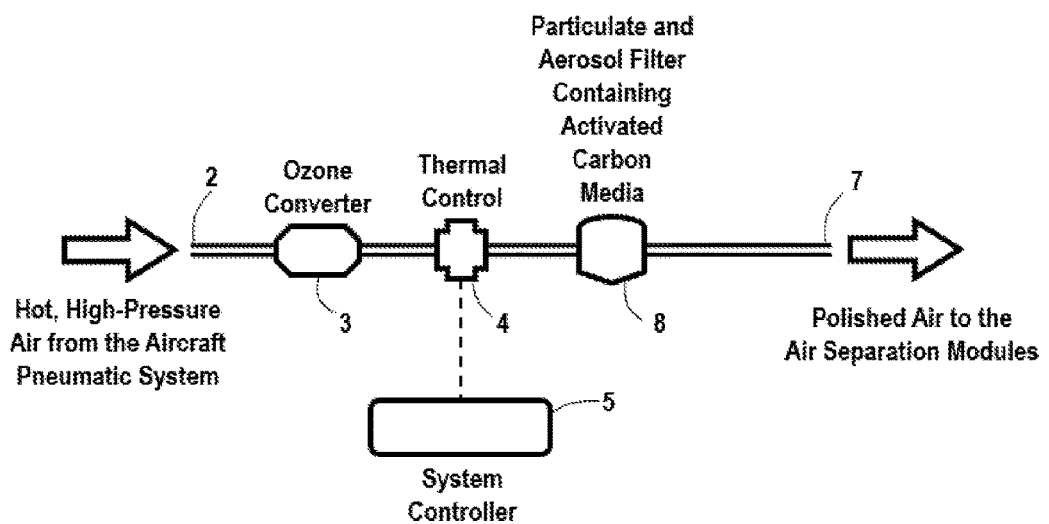
FIG. 2 is a schematic view of a conventional aircraft inerting system with an activated carbon filtration unit.

FIG. 2 shows the same conventional inerting system of FIG. 1, with the exception that the filter 6 has been augmented to include an adsorption media, such as activated carbon. In addition to particulate and aerosol contaminants, the engine bleed air may be contaminated with various gases, including VOCs, the source of which may be degradation products from jet fuel, engine lubricating oils, hydraulic fluid, de-icing agents, engine exhaust and other contaminants present in the atmosphere. As the flow passes through the filter 8, the VOCs present in the air stream will be adsorbed onto the surface of the active carbon, thereby preventing them from migrating downstream where they can foul or damage the ASMs. VOCs will continue to accumulate in the filter 8 until the active carbon media is saturated, after which time the VOCs will begin passing through the filter 8. To achieve full benefit of VOC protection for the ASMs, the active carbon filter 8 should be sized such that it does not saturate within the maintenance period of the filter 8 (typically about 7,000 flight hours), after which the filter element would be replaced. However, such an approach would result in an enormous size of the filter element. That is, the filter element itself would be larger than the rest of the inerting system. Accordingly, this approach is not practical.

To make active carbon filtration practical for use in aircraft inerting systems, in accordance with the present invention, regeneration of the activated carbon is incorporated into the system. During regeneration, conditions are created which enable VOCs trapped in the carbon media to be liberated from the carbon surface, a process which is facilitated by higher media temperatures and lower gas pressures. Furthermore, upon release of the VOCs from the carbon, it is necessary to ensure they do not subsequently flow into the ASM, as this would defeat the very purpose of the activated carbon.

Figure 3:
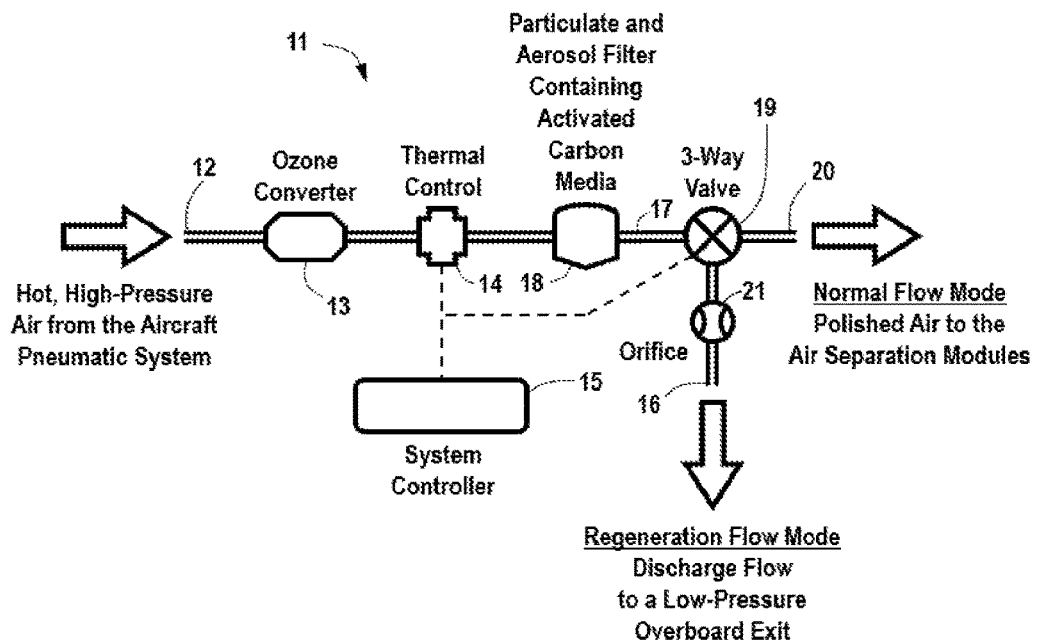
FIG. 3 is a schematic view of an exemplary aircraft inerting system in accordance with the present invention, including activated carbon filtration regeneration.

FIG. 3 shows an exemplary inerting system in accordance with the present invention. The inerting system 11 includes an inlet 12 arranged to receive hot, high-pressure air extracted from the aircraft bleed air system (not shown). The air received from the aircraft bleed air system at inlet 12 is typically at a temperature of about 200° C. The air passes downstream through an ozone converter 13. Because engine bleed air supplied from the aircraft engines will typically be at too high a temperature for use by the ASM, the engine bleed air can be cooled by passage through a heat exchanger (not shown) of thermal control unit 14. Regulation of the air temperature entering the ASMs is accomplished by means of the system controller 15, as well as sensors and a source of cooling air (not shown). The cooled air is filtered by filtration module 18 to remove particulates and aerosols from the air stream. Filtration module 18 also includes activated carbon to remove VOCs from the air stream. A three-way valve 19 is installed in transport line 17 between the filtration module 18 and the ASM (not shown). System controller 15 is arranged to control operation of valve 19.

During "normal" system operation, the three-way valve 19 is positioned such that the flow exiting the filtration module 18 is directed to the ASM inlet 20. During regeneration mode, however, the valve 19 is re-positioned to discharge the flow overboard to the low pressure ambient environment through an appropriately sized orifice 21 to overboard outlet 16. Once in this position, the system controller 15 causes the thermal control unit 15 to raise the temperature of the air entering the filtration module 18, thereby heating up the active carbon media to facilitate release and discharge of the adsorbed VOCs.

The magnitude of the system air flow rate during regeneration mode is governed by the size of the orifice 21 downstream of (or incorporated into) the three-way valve 19. A small sized orifice prevents excessive bleed air draw from the aircraft, while a larger sized orifice reduces the gas pressure within the filtration module 18 and further enhances the release of adsorbed VOCs from the active carbon media of the filtration module 18.

The regeneration activity continues for a period of time sufficient to allow the filtration module 18 to discharge the VOCs accumulated during normal operation, and restore the adsorption capacity of the active carbon media of filtration module 18 to its original value. After such time, the system controller 15 reduces the air temperature to the normal set-point value and repositions the three-way valve 19, thus ending the regeneration cycle. Preferably, the regeneration cycle is conducted during the cruise portion of a flight, i.e., at high altitude, when discharge pressures and bleed air contamination loads would be the lowest. In the embodiment shown in FIG. 3, aircraft bleed air alone is used to heat the active carbon media of the filtration module 18.

Figure 4:
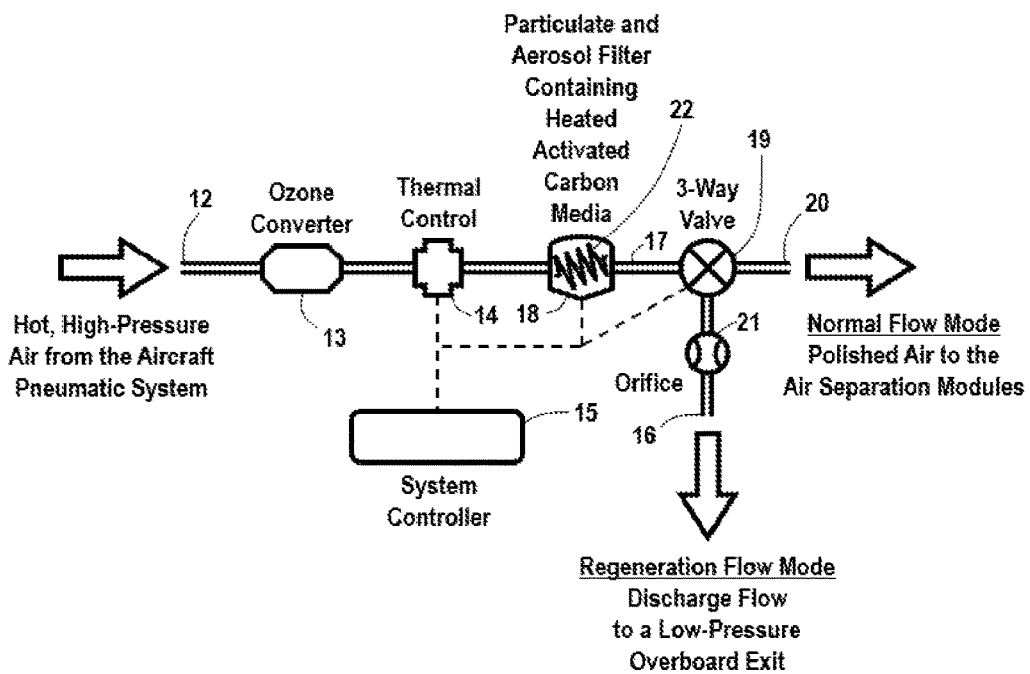
FIG. 4 is a schematic view of an inerting system as in FIG. 3, further including electric heating of the activated carbon.

Referring to FIG. 4, the system includes all of the elements of the system shown in FIG. 3, but further includes the ability to electrically heat the active carbon media of the filtration module 18 in regeneration mode by including a heating element 22 within the filtration module 18. The heating element 22 is controlled by the system controller 15. This functionality may be used either in place of, or in conjunction with, changing the thermal control set-point to affect release of adsorbed VOCs. While electrical heating accomplishes the regeneration in a shorter period of time, the time savings comes at the expense of additional electrical power consumption.

Figure 5:
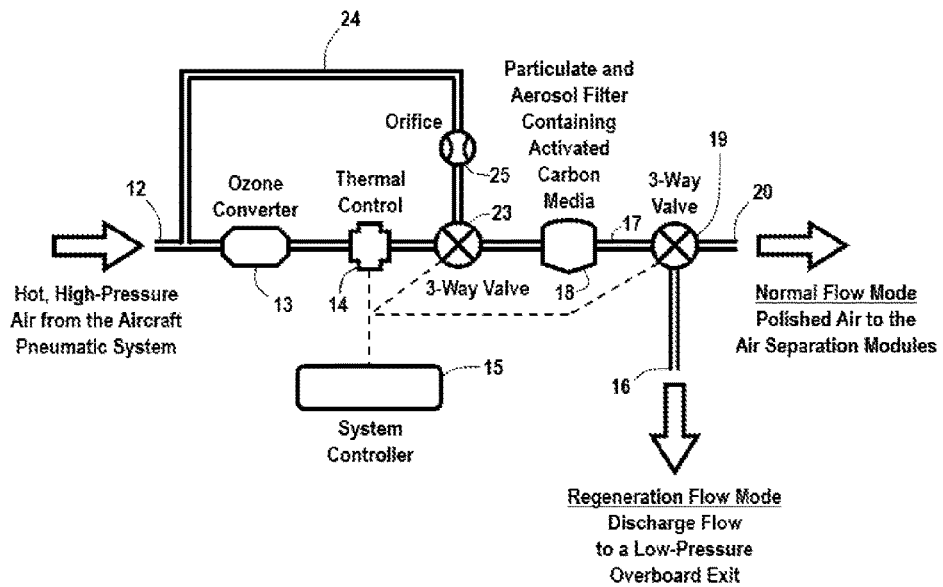
FIG. 5 is a schematic view of an exemplary aircraft inerting system in accordance with the present invention, including high temperature bypass flow.

Referring to FIG. 5, in one embodiment of the aircraft inerting system, two three-way valves are incorporated into the system: a first valve 19 downstream of the filtration module 18 and a second valve 23 upstream of the filtration module 18. As with the previously described embodiments, the first valve 19 downstream of the filtration module 18 directs the filter exit flow either to the ASMs (normal mode), or discharges it overboard to the low-pressure ambient environment (regeneration mode) via overboard outlet 16. The second valve 23 upstream of the filter determines the state of the air fed into the filtration module 18. In normal mode, the filter inlet air is conditioned by the ozone converter 13 and thermal control system 14. In regeneration mode, bypass line 24 allows engine bleed air flow to bypass the ozone converter 13 and the thermal control system 14 to allow the highest temperature air to reach the filtration module 18. In addition, the bypass line 24 incorporates an orifice 25 which serves two purposes: (i) to restrict the amount of bleed flow drawn from the aircraft during regeneration, and (ii) to reduce the gas pressure in the filtration module 18 during regeneration. The combination of high-temperature, low-pressure air in the filtration module 18 provides optimal conditions for releasing the adsorbed VOCs from the active carbon media. The two three-way valves 19, 23 are controlled in a synchronized manner by the system controller 15. It is possible to incorporate the two three-way valves into a single housing body through appropriate design and port placement. As with previously described embodiments, the regeneration cycle is preferably conducted during the cruise portion of a flight, when discharge pressures and contamination loads are at their lowest.

Figure 6:
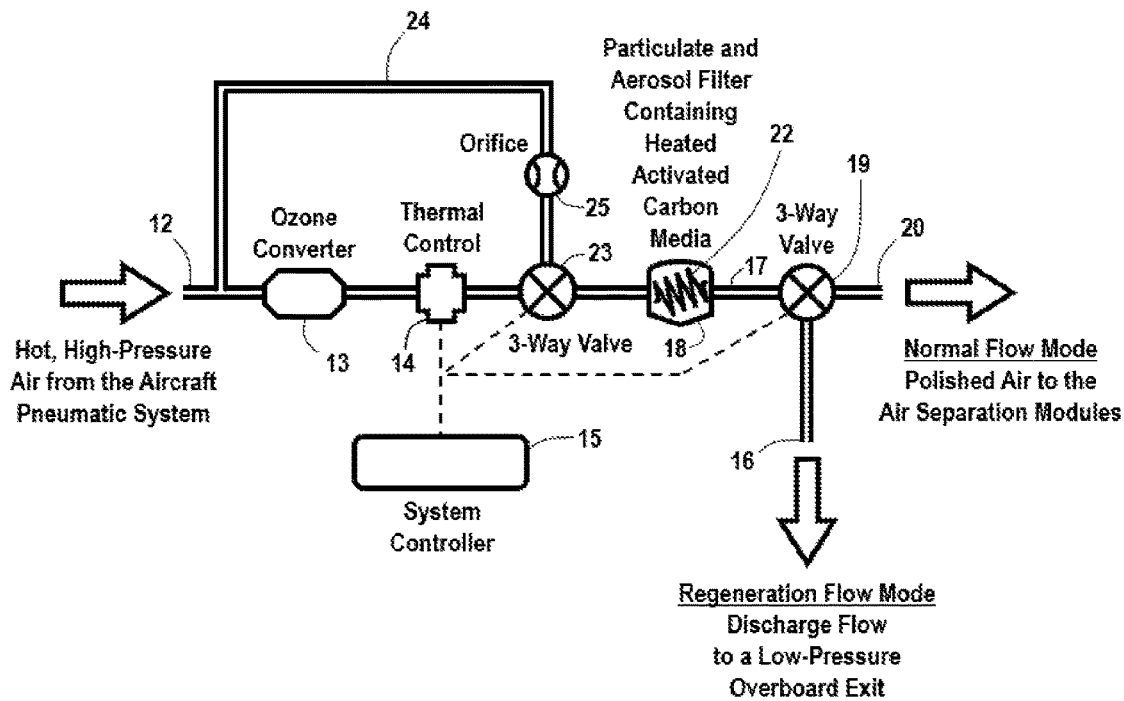
FIG. 6 is a schematic view of an inerting system as in FIG. 5, further including electric heating of the activated carbon.

FIG. 6 shows a system architecture similar to that shown in FIG. 5, but with the addition of a heating element 22 for electrically heating the activated carbon media of the filtration module 18.

Figure 7:
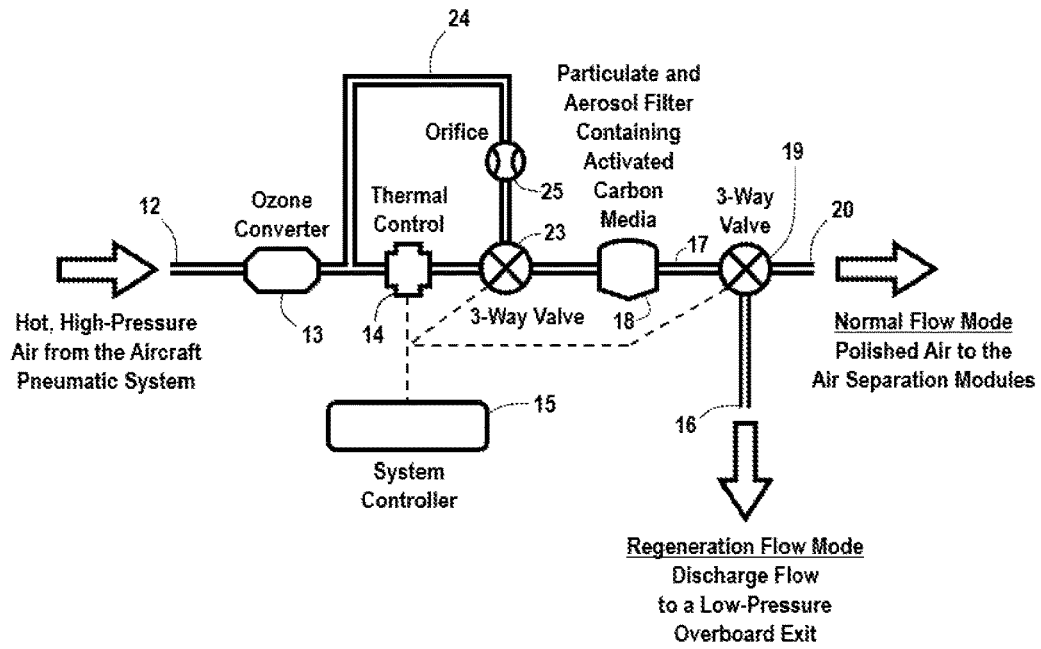
FIG. 7 is a schematic view of an exemplary aircraft inerting system in accordance with the present invention, including an alternative bypass flow.
Figure 8:
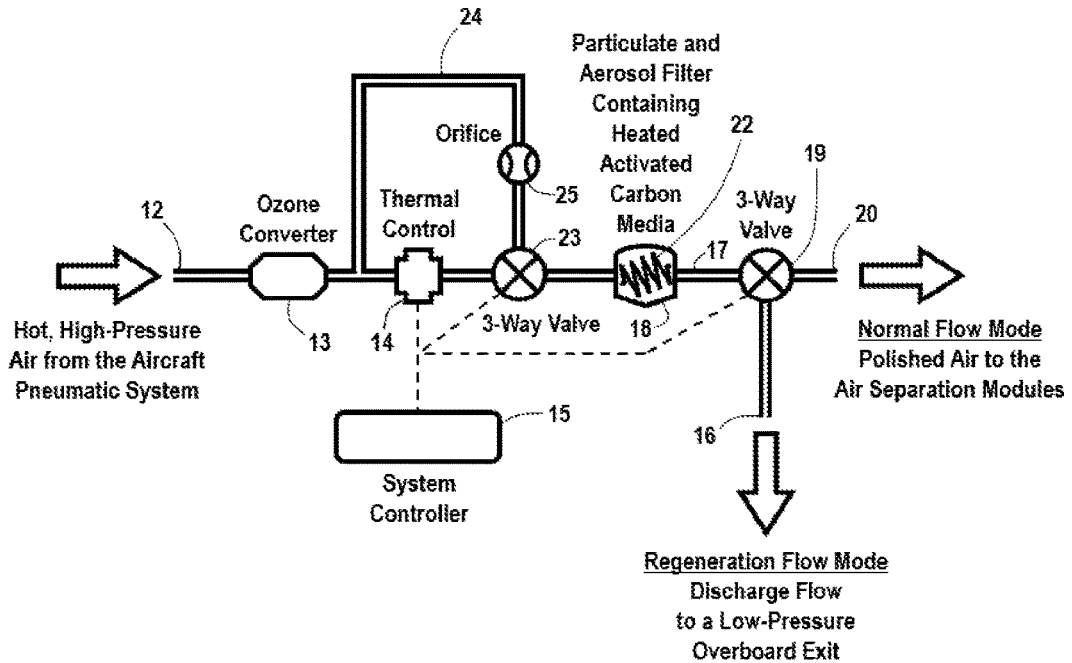
FIG. 8 is a schematic view of an inerting system as in FIG. 7, further including electric heating of the activated carbon.

FIGS. 7 and 8 show variations of the embodiments shown in FIGS. 5 and 6, respectively, in which the tapping point for the bypass line 24 is moved downstream of the ozone converter 13. This configuration ensures that the flow passing through the filtration module 18 during regeneration mode takes advantage of the ozone reduction provided by the system ozone converter 13, and also reduces the length of the bypass line 24. If the ozone converter is located far upstream of the thermal control system, the reduction in the length of the bypass line length could be considerable. The cost for these advantages, however, would likely be a lower gas temperature when the flow reaches the filtration module 18, thereby reducing the rate of VOC release during regeneration as compared to the configuration of FIGS. 5 and 6.

The principles, preferred embodiments and modes of operation of the present invention have been described in the foregoing specification. The invention that is intended to be protected herein should not, however, be construed as limited to the particular form described as it is to be regarded as illustrative rather than restrictive. Variations and changes may be made by those skilled in the art without departing from the scope and spirit of the invention as set forth in the appended claims.

The invention claimed is:

1. A method of regenerating a filter in an onboard aircraft inerting system comprising:
providing a stream of pressurized air, the pressurized air containing VOC contaminants;
passing the stream of air through a filter module containing activated carbon media to adsorb the VOC contaminants;
directing the flow of air exiting the filter module in a regeneration mode of operation to a passage connected to an overboard outlet for release to a lower pressure ambient environment;
regenerating the activated carbon media by desorbing the VOC contaminants adsorbed on the carbon media while the aircraft is in flight; wherein desorbing the VOC contaminants comprises raising the temperature of the carbon media to a temperature sufficient to release the VOC contaminants adsorbed thereon; and
directing the flow of air exiting the filter module to an air separation module following completion of regeneration of the carbon media of the filter module.

2. The method of claim 1, wherein raising the temperature of the carbon media comprises heating the carbon media using a heating device located in the filter module.

3. The method of claim 1, wherein the stream of pressurized air containing VOC contaminants is at a temperature of at least 50° C.

4. The method of claim 1 further comprising lowering the pressure of the air stream entering the filter module.

5. The method of claim 1, further comprising reducing the temperature of the pressurized air stream in a thermal control unit upstream of the filter module prior to passing the air stream through the filter module.

6. The method of claim 1, wherein raising the temperature of the carbon media comprises raising the temperature of the air entering the filter module.

7. The method of claim 1, further comprising passing the stream of pressurized air through an ozone converter upstream of the filter module.

8. The method of claim 1, further comprising controlling the temperature of the air stream entering the filter module using a thermal control system upstream of the filter module.

\* \* \* \* \*